US012791738B2

(12) United States Patent
Oshita

(10) Patent No.: US 12,791,738 B2
(45) Date of Patent: Nov. 10, 2026

(54) WEARABLE DEVICE, MOVEMENT INFORMATION ACQUISITION CONTROL METHOD AND RECORDING MEDIUM

(71) Applicant: CASIO COMPUTER CO., LTD., Tokyo (JP)

(72) Inventor: Yuuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 295 days.

(21) Appl. No.: 18/362,291

(22) Filed: Jul. 31, 2023

(65) Prior Publication Data

US 2024/0045081 A1 Feb. 8, 2024

(30) Foreign Application Priority Data

Aug. 4, 2022 (JP) ................................ 2022-124520

(51) Int. Cl.
*G01S 19/49* (2010.01)
*G01C 21/16* (2006.01)
*G01S 19/19* (2010.01)
*G01S 19/34* (2010.01)

(52) U.S. Cl.
CPC .............. *G01S 19/49* (2013.01); *G01S 19/19* (2013.01); *G01S 19/34* (2013.01); *G01C 21/165* (2013.01)

(58) Field of Classification Search
CPC .......... G01S 19/49; G01S 19/19; G01S 19/34; A61B 5/6801; A61B 5/681; A61B 5/1112; G01C 21/165
See application file for complete search history.

(56) References Cited

U.S. PATENT DOCUMENTS

2012/0223860 A1* 9/2012 Leclercq ................ G01S 19/34 342/357.74
2012/0326922 A1* 12/2012 Yang ...................... G01S 19/34 342/357.3
2015/0172854 A1* 6/2015 Stogaitis ............ H04W 64/003 370/328
2015/0230048 A1* 8/2015 Parameshwaran ..... G01C 21/20 455/456.1

(Continued)

FOREIGN PATENT DOCUMENTS

JP 2012-098137 A 5/2012

OTHER PUBLICATIONS

Extended European search report dated Dec. 22, 2023, in a counterpart European patent application No. 23189228.2.

*Primary Examiner* — Brady W Frazier
*Assistant Examiner* — Noah Yi Min Zhu
(74) *Attorney, Agent, or Firm* — CHEN YOSHIMURA LLP

(57) ABSTRACT

A wearable device includes a physical sensor that performs measurements relating to an orientation and movement of the wearable device; an acquisition unit that acquires information representing a user's exercise type; and a processor that performs positioning of the wearable device based on radio waves received from satellites, wherein the processor determines whether to calculate a movement amount of the wearable device per set intervals based on measurement results of the physical sensor during a period in which the positioning based on radio waves received from satellites is not obtained, in accordance with the user's exercise type acquired by the acquisition unit.

12 Claims, 5 Drawing Sheets

(56) References Cited

U.S. PATENT DOCUMENTS

| | | | | |
|---|---|---|---|---|
| 2016/0263435 | A1* | 9/2016 | Venkatraman | A61B 5/1123 |
| 2017/0027523 | A1* | 2/2017 | Venkatraman | A61B 5/721 |
| 2018/0087903 | A1* | 3/2018 | Werner | G01S 19/49 |
| 2018/0352381 | A1* | 12/2018 | Jensen | H04W 52/0254 |
| 2018/0364064 | A1 | 12/2018 | Toda | |
| 2019/0038933 | A1* | 2/2019 | Nagasaka | A63B 69/16 |
| 2019/0038937 | A1* | 2/2019 | Nagasaka | A63B 24/0021 |
| 2019/0038938 | A1* | 2/2019 | Nagasaka | A63B 24/0021 |
| 2019/0101654 | A1* | 4/2019 | Youssef | G01C 21/165 |
| 2019/0154843 | A1* | 5/2019 | Kim | G01S 19/396 |
| 2020/0330003 | A1* | 10/2020 | Zakharov | A61B 3/024 |
| 2021/0174971 | A1* | 6/2021 | Jain | G16H 10/20 |
| 2021/0262800 | A1* | 8/2021 | Levine | G06F 3/012 |
| 2021/0333411 | A1* | 10/2021 | Gum | G01S 19/21 |
| 2022/0113366 | A1* | 4/2022 | Pipelidis | H04W 4/027 |

* cited by examiner

WEARABLE DEVICE, MOVEMENT INFORMATION ACQUISITION CONTROL METHOD AND RECORDING MEDIUM

BACKGROUND OF THE INVENTION

Technical Field

The present disclosure relates to a wearable device, a movement information acquisition control method, and a storage medium therefor.

Background Art

Conventionally, there is a wearable device that is fixed to a user's arm (including wrist), leg, torso, or the like and measures the user's activity and vitals. This wearable device receives radio waves from positioning satellites associated with the GNSS (Global Navigation Satellite System) and performs positioning (satellite positioning) to identify the position of the user who moves along with the activity so as to acquire movement associated information such as movement histories and moving distances, etc.

Satellite positioning is difficult underground, in tunnels, and indoors, where radio waves cannot be received from positioning satellites. It is also difficult to obtain accurate positioning results in places where radio waves are difficult to receive from wide directions, such as valleys between skyscrapers and mountains. In addition, there are cases where a portable device performs positioning operations intermittently in order to reduce power consumption. In these cases, the user's relative walking movement amount is calculated using a physical quantity measurement sensor such as an acceleration sensor or an orientation sensor, and the measured results are added to the reference position to determine the movement history between the positions determined by satellite positioning. Japanese Patent Application Laid-Open No. 2012-98137, which has technology related to dead reckoning, discloses that data related to relative movement can be obtained more accurately by changing the detection pattern for acceleration according to the holding state of the aircraft during measurement with dead reckoning.

SUMMARY OF THE INVENTION

Features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a wearable device, comprising: a physical sensor that performs measurements relating to an orientation and movement of the wearable device; an acquisition unit that acquires information representing a user's exercise type; and a processor that performs positioning of the wearable device based on radio waves received from satellites, wherein the processor determines whether to calculate a movement amount of the wearable device per set intervals based on measurement results of the physical sensor during a period in which the positioning based on radio waves received from satellites is not obtained, in accordance with the user's exercise type acquired by the acquisition unit.

In another aspect, the present disclosure provides a method for controlling acquisition of movement information of a wearable device, performed by the wearable device, the wearable device including a physical sensor that performs measurements relating to an orientation and movement of the wearable device, the method comprising: acquiring information representing a user's exercise type; performing positioning of the wearable device based on radio waves received from satellites; and determining whether to calculate a movement amount of the wearable device per set intervals based on measurement results of the physical sensor during a period in which the positioning based on radio waves received from satellites is not obtained, in accordance with the user's exercise type.

In another aspect, the present disclosure provides a non-transitory storage medium readable by a computer in a wearable device that includes a physical sensor that performs measurements relating to an orientation and movement of the wearable device, the non-transitory storage medium storing a program executable by the computer, the program causing the wearable device to perform the following: acquiring information representing a user's exercise type; performing positioning of the wearable device based on radio waves received from satellites; and determining whether to calculate a movement amount of the wearable device per set intervals based on measurement results of the physical sensor during a period in which the positioning based on radio waves received from satellites is not obtained, in accordance with the user's exercise type.

It is to be understood that both the foregoing general description and the following detailed description are exemplary and explanatory, and are intended to provide further explanation of the disclosure as claimed.

DETAILED DESCRIPTION OF EMBODIMENTS

In dead reckoning, when the movement is not on foot, it has been difficult to appropriately determine the operational interval for the user's movement and the movement speed of the user's movement per operational interval, and as a result, the deviation from the actual movement history tends to increase, which is a problem.

An object of the present disclosure is to provide a wearable device, movement information acquisition control method, and a storage medium that stores a computer executable program that perform such a method that reflect a user's exercise type more and that can switch modes more appropriately.

Figure 1:
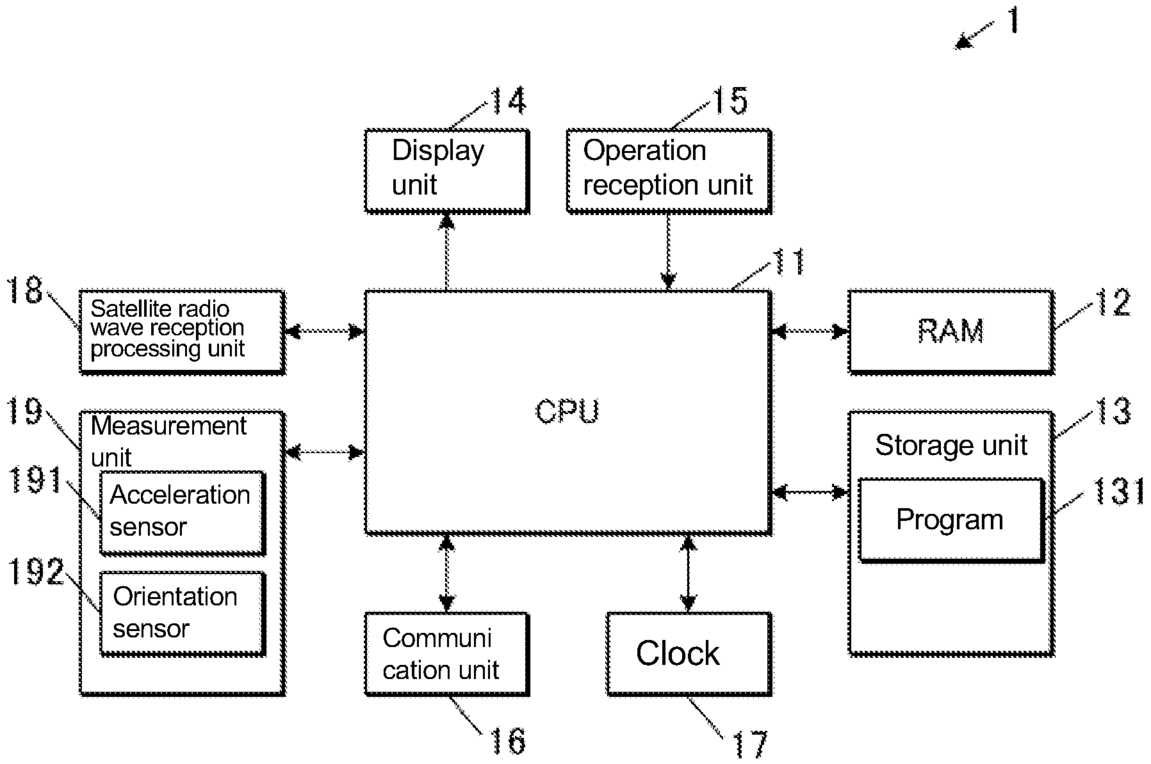
FIG. 1 is a block diagram showing the functional configuration of an electronic timepiece.

Embodiments will be described below with reference to the drawings. FIG. 1 is a block diagram showing the functional configuration of an electronic timepiece 1, which is a wearable device according to this embodiment. The electronic timepiece 1 includes a CPU 11 (Central Processing Unit) (control unit), a RAM 12 (Random Access Memory), a storage unit 13, a display unit 14, an operation reception unit 15 (acquisition unit), a communication unit 16, a clock unit 17, a satellite radio wave reception processing unit 18 (positioning processing unit), and a measurement unit 19, etc.

The CPU 11 is a processor that performs arithmetic processing and controls the overall operation of the electronic timepiece 1. A single processor may be used, or a plurality of processors may operate in parallel or independently depending on the application. Further, the CPU 11 may be a dedicated microcomputer or the like in addition to or instead of the general-purpose CPU. Generally, in this disclosure, the word “processor” can be a single processor or a plurality of separate processors that operate in parallel or independently.

The RAM 12 is, for example, a DRAM, and provides a work memory space to the CPU 11 to store temporary data.

At least the CPU 11 and RAM 12 are included in the computer of the wearable device of this embodiment.

The storage unit 13 is a non-volatile memory such as a flash memory. The storage unit 13 stores a program 131, setting data, and the like.

The display unit 14 displays at least the time based on the control of the CPU 11. The display unit 14 may have a digital display screen such as a liquid crystal display, or may have a plurality of hands (hour hand, minute hand, etc.), a gear train (wheel train mechanism) and a stepping motor or the like for rotating the wheel train mechanism The operation reception unit 15 receives an input operation from the outside such as a user and outputs a reception signal to the CPU 11. The operation reception unit 15 has, for example, a push button switch, and detects a pressing operation of the push button switch to output a reception signal. Further, the operation reception unit 15 may have a crown that can be pulled out and rotated.

The communication unit 16 controls communications with external devices. The communication unit 16 has, for example, a network card for LAN communication, a communication module for short-range wireless communication using Bluetooth (registered trademark), and the like, and for example, it controls transmission of activity measurement results of the electronic timepiece 1 to an external device.

The clock unit 17 counts clock signals with a certain oscillation frequency generated by an oscillation circuit (not shown) and outputs the current date and time. The clock unit 17 may be one in which the CPU 11 counts the date and time using software.

The satellite radio wave reception processing unit 18 has an antenna (not shown), receives radio waves from a plurality (at least four) of positioning satellites in the sky, and performs positioning operations in which the current date and time and the current position of the electronic timepiece 1 are calculated based on the received contents and the timing difference thereof. The positioning satellites from which radio waves are received include those related to GNSS (Global Positioning System) such as Global Positioning System (GPS), Quasi-Zenith Satellite System (QZSS), GLONASS, and Galileo. The satellite radio wave reception processing unit 18 has a reception processing unit that receives radio waves from positioning satellites and demodulates and decodes the signals, and an arithmetic processing unit that performs positioning calculations based on the contents of the signals. The reception processing unit and/or the arithmetic processing unit may be configured by a combination of a CPU (not shown) that is different from the CPU 11 and a circuit for demodulation and decoding. Here, the arithmetic processing unit may be realized as a function of the CPU 11.

The measurement unit 19 has physical sensors that measure the orientation and movement of the timepiece itself, and outputs the measurement results of each sensor to the CPU 11. The physical sensors include, for example, an acceleration sensor 191 and an orientation sensor 192.

The acceleration sensor 191 measures acceleration in three axial directions. Although the three axial directions may be determined appropriately (for example, two axes parallel to the display surface of the display unit 14 and one axis perpendicular to the display surface), since the gravitational acceleration can be measured, it is also possible to separate components in directions in the horizontal plane and in the gravitation direction by coordinate transformation. The orientation sensor 192 is a sensor that measures the earth’s magnetic field, and can obtain the orientation of magnetic north by measuring the magnetic field strength in three axial directions.

The electronic timepiece 1 of this embodiment is, for example, a wristwatch-type electronic device that can be worn on the wrist with a band.

Next, the position information acquisition operation in the electronic timepiece 1 will be described.

Once the electronic timepiece 1 of the present embodiment accepts (acquires) the setting as to which activity (exercise type) is to be performed by the user by the user’s input operation performed on the operation reception unit 15, it starts measuring for the activity. Activity measurement ends when an instruction to end activity measurements is received by an input operation, when a specified maximum duration elapses, or when a reference time elapses without movement being measured.

The activities mentioned here are those involving movement of position in the horizontal directions, and include the run-walk group activities (movement due to running or walking), such as walking (walking, strolling, hiking, trekking, mountain climbing) and running (running, jogging, cross-country, trail running), etc., as well as the non-run-walk group activities (not involving the user’s running or walking), such as bicycling (cycling, long ride), skiing (downhill), snowboarding, swimming, etc. Note that cross-country skiing may be regarded as a run-walk activity.

With the electronic watch 1, for run-walk group activities, satellite positioning operations are performed intermittently, and the position between them is complemented by adding the amount of movement by dead reckoning. In dead reckoning, the user’s relative run-walk movement amount is calculated using the measurement unit 19 such as the acceleration sensor 191 and the orientation sensor 192. That is, Pedestrian Dead-Reckoning (PDR) is used to supplement the movement trajectory. On the other hand, as described above, since the technology of dead reckoning cannot obtain sufficient accuracy except for run-walk type movements, for non-run-walk group activities, the amount of movement is not calculated by dead reckoning. In this case, based on the measurement results of the measurement unit 19, such as the acceleration sensor 191 and the orientation sensor 192, which respectively measure the movement and orientation of the device itself, it is determined whether the direction of movement of the user has changed. And if the movement direction is found to have changed, the device performs satellite positioning operation. That is, the electronic timepiece 1 determines whether or not to calculate the moving distance and the current position by dead reckoning according to the activity (exercise type).

Here, since the measurements by the measurement unit 19 for dead reckoning during the run-walk activity consumes sufficiently less power than the operation of the satellite radio wave reception processing unit 18, it is not necessary to stop the operation of measurements by the measurement unit 19 even when positioning is being performed by the satellite radio wave reception processing unit 18, and the operation may be continued during the satellite positioning operation period. However, in order to operate the electronic timepiece 1 with lower power consumption, the measurement unit 19 for dead reckoning may be operated only when the satellite radio wave reception processing unit 18 is idle. During a non-run-walk activity, only the orientation sensor 192 may operate as necessary in the manner as described above. Or alternatively, the operation of the measurement unit 19 may be continued regardless of the activities considering other functions it may be assigned to perform.

The directional change in this case may be detected by appropriately considering cumulative directional changes and average directional changes so that the detection of at least gradual changes in direction, such as curves, is possible while avoiding the detection of each minute turn, etc., during skiing. The criteria for the consideration and the reference value (lower limit) of the angle change to be detected may be determined according to the type of activity.

Figure 2A:
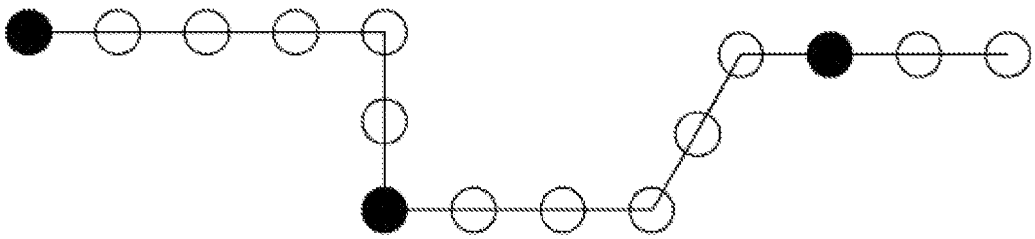
FIGS. 2A-2B are diagrams showing examples of position acquisition when movement histories are acquired for a run-walk activity and a non-run-walk activity, respectively.
Figure 2B:
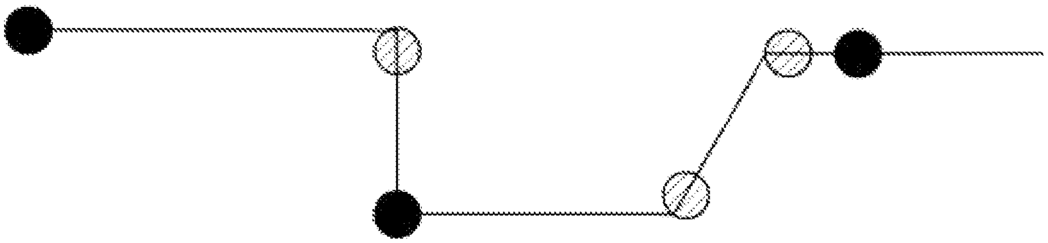

FIGS. 2A-2B are diagrams showing an example of position acquisition when movement histories are acquired for a run-walk activity and a non-run-walk activity, respectively.

As shown in FIG. 2A, in the run-walk activity, for example, intermittent satellite positioning is performed at fixed intervals (black circles) with rest/idle periods (periods in which positioning is not performed) in between. The current position is calculated by calculating the direction of movement and the distance traveled (movement amount) for each time using dead reckoning periodically at time intervals (the white circles) shorter than the rest/idle period, and adding it to the reference satellite positioning position. At this time, as the number of times of addition increases, the position obtained by the dead reckoning also accumulates errors, so it may be corrected by a known technique based on the most recent satellite positioning results.

On the other hand, as shown in FIG. 2B, satellite positioning is intermittently (at a regular interval) performed even in the non-run-walk activity (black circles), but the current position is not calculated by dead reckoning during the set interval between the satellite positionings. Instead, when a change in the direction of travel is detected by the measurement of the measurement unit 19 (especially the orientation sensor 192), satellite positioning is additionally performed by the satellite radio wave reception processing unit 18 to determine the position at the vicinity of the change point of the direction of travel (hatched circles). In this way, even in a non-run-walk activity, measurement is performed that enables an outline of the movement route to be obtained without significantly increasing power consumption.

Figure 3:
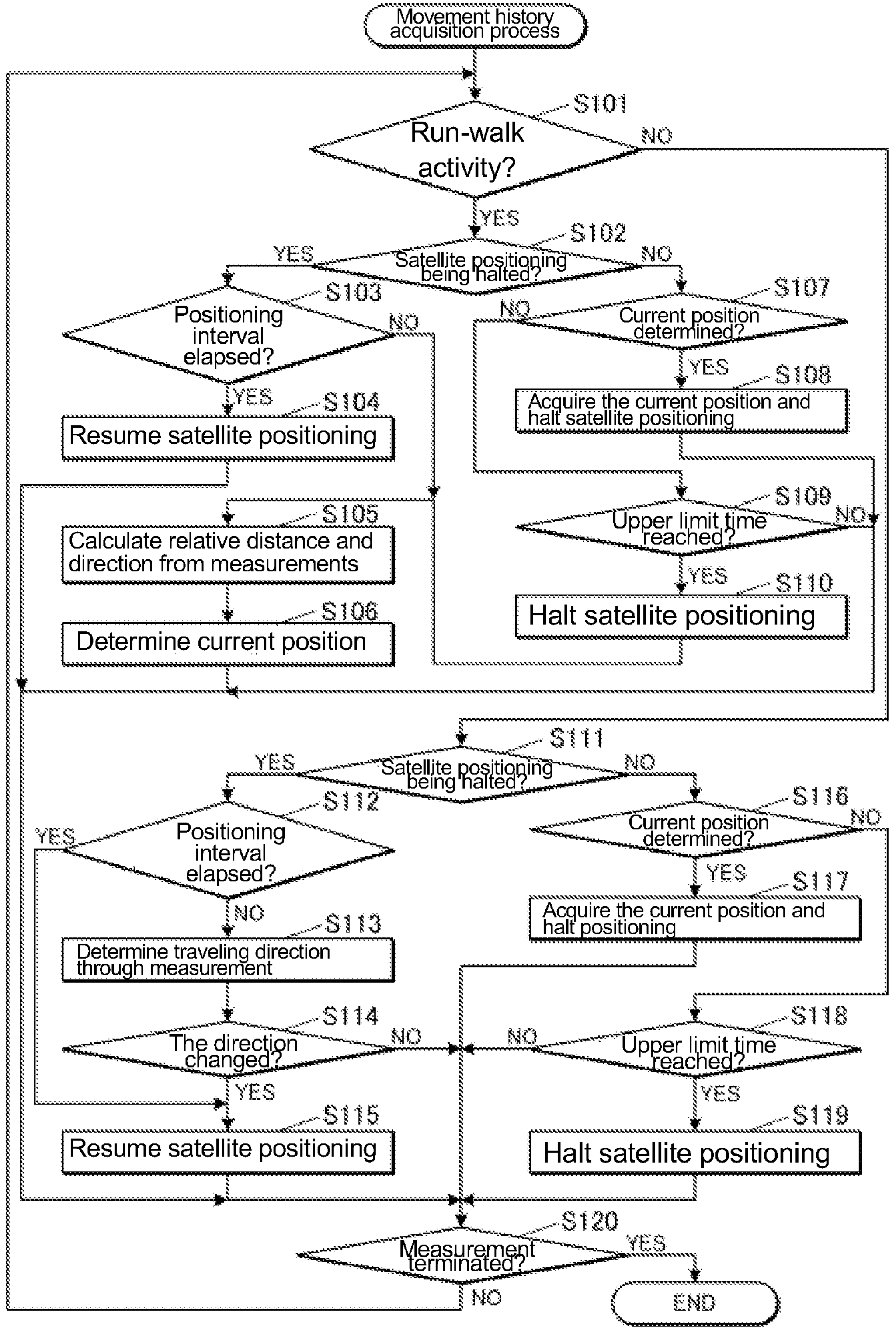
FIG. 3 is a flowchart showing a control procedure of movement history acquisition processing.

FIG. 3 is a flowchart showing the control procedure by the CPU 11 of the movement history acquisition process executed by the electronic timepiece 1. This movement history acquisition process is started when the operation reception unit 15 acquires instructions for selecting an activity and starting movement history measurement.

The CPU 11 determines whether the selected activity is of run-walk type or not (step S101). When it is determined that the system is a run-walk group activity ("YES" in step S101), the CPU 11 determines whether or not satellite positioning is being halted or not (step S102).

When it is determined that satellite positioning is being halted ("YES" in step S102), the CPU 11 determines whether or not the positioning interval has elapsed since the previous satellite positioning (step S103). When it is determined that the positioning interval has elapsed ("YES" in step S103), the CPU 11 causes the satellite radio wave reception processing unit 18 to resume satellite positioning (step S104). Then, the processing of the CPU 11 proceeds to step S120.

When it is determined that the positioning interval has not elapsed ("NO" in step S103), the CPU 11 calculates the relative movement distance and the movement direction from the measurement values of the measurement unit 19 (step S105)). The CPU 11 then determines the current position by adding the relative movement distance and movement direction to the previous position (step S106). Then, the processing of the CPU 11 proceeds to step S120.

When it is determined in the determination process of step S102 that the satellite positioning is not being halted ("NO" in step S102), the CPU 11 determines whether or not the current position is determined by satellite positioning (step S107)). If it is determined that the current position has been determined ("YES" in step S107), the CPU 11 acquires the specified current position and halts satellite positioning (step S108). Then, the processing of the CPU 11 proceeds to step S120.

When it is determined that the current position is not determined by satellite positioning ("NO" in step S107), the CPU 11 determines whether or not the upper limit time has elapsed since the start (restart) of the processing for positioning (step S109). If it is determined that the upper limit time has not been reached ("NO" in step S109), the process of the CPU 11 returns to step S101. If it is determined that the upper limit time has elapsed ("YES" in step S109), the CPU 11 halts the satellite positioning operation by the satellite radio wave reception processing unit 18 (step S110), and then proceeds to step S105.

When it is determined in the determination process of step S101 that the selected activity is not a run-walk group activity ("NO" in step S101), the CPU 11 determines whether or not satellite positioning is being halted. (Step S111).

When it is determined that satellite positioning is being halted ("YES" in step S111), the CPU 11 determines whether or not a positioning interval has elapsed since the previous satellite positioning (step S112). When it is determined that the positioning interval has elapsed ("YES" in step S112), the CPU 11 resumes satellite positioning by the satellite radio wave reception processing unit 18 (step S115). Then, the processing of the CPU 11 proceeds to step S120.

When it is determined that the positioning interval has not elapsed ("NO" in step S112), the CPU 11 determines the traveling direction from the measurement value of the measuring unit 19 (step S113). The CPU 11 determines whether or not a change in traveling direction has been detected (step S114). If it is determined that a change in traveling direction has been detected ("YES" in step S114), the processing of the CPU 11 proceeds to step S115. If it is determined that no change in traveling direction has been detected ("NO" in step S114), the processing of the CPU 11 proceeds to step S120.

When it is determined in the determination process of step S111 that the satellite positioning is not being halted ("NO" in step S111), the CPU 11 determines whether or not the current position is determined by satellite positioning (step S116)). If it is determined that the current position has been determined ("YES" in step S116), the CPU 11 acquires the specified current position and halts satellite positioning by the satellite radio wave reception processing unit 18 (step S117). Then, the processing of the CPU 11 proceeds to step S120.

When it is determined that the current position has not been determined ("NO" in step S116), the CPU 11 determines whether or not the upper time limit of continuing satellite positioning operation has elapsed (step S118). If it is determined that the upper limit time has not been reached ("NO" in step S118), the process of the CPU 11 proceeds to step S120. If it is determined that the upper limit time has elapsed ("YES" in step S118), the CPU 11 halts the satellite positioning operation by the satellite radio wave reception processing unit 18 (step S119). Then, the processing of the CPU 11 proceeds to step S120.

When proceeding to the process of step S120, the CPU 11 determines whether or not an instruction to terminate activity measurement has been acquired (step S120). If it is determined that the instruction to terminate the measurement has not been acquired ("NO" in step S120), the process of the CPU 11 returns to step S101. When it is determined that the instruction to terminate the measurement has been acquired ("YES" in step S120), the CPU 11 ends the process for the acquisition of the movement history, and terminates the movement history acquisition process.

The processes of steps S101, S102, and S111 constitute a calculation determination unit of this embodiment.

Figure 4A:
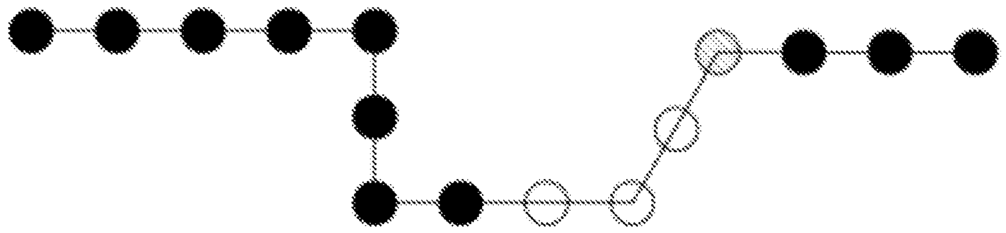
FIGS. 4A-4B are diagrams showing examples of moving distance acquisition when moving distances are acquired for a run-walk activity and a non-run-walk activity, respectively.
Figure 4B:
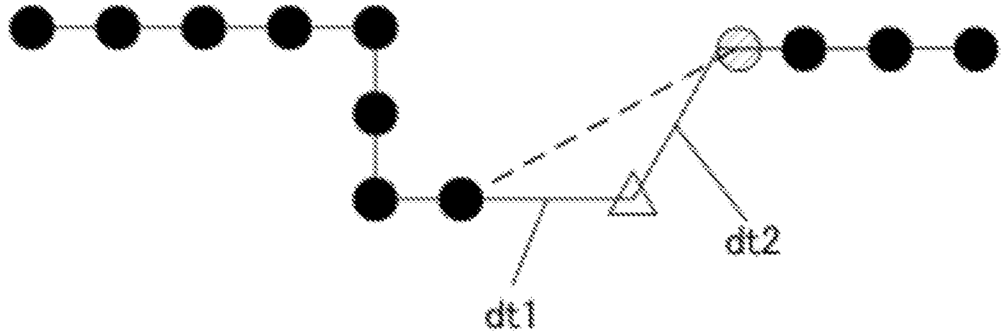

FIGS. 4A-4B are diagrams showing examples of moving distance acquisition when moving distances are acquired for a run-walk activity and a non-run-walk activity, respectively.

As shown in FIG. 4A, if, during the process of obtaining the movement distance from the amount of change in the current positions (black circles) obtained by performing satellite positioning in a run-walk activity, the satellite positioning result could not be obtained (i.e., if the acquisition fails, for example, in a tunnel, underground, in a building or in a deep valley of a mountain, as described above), the process is switched to relative movement distance measurement by dead reckoning, and the total movement distance can be obtained by accumulating the relative movement distances (in this case, the current positions indicated by the white circles do not necessarily have to be specified).

When the acquisition of satellite positioning results is resumed, the distance moved from the previous position cannot be obtained from the first position after the restart (the circle hatched with diagonal lines), so the distance moved from the previous position to this timing can be the distance obtained by dead reckoning. When the current position is determined by accumulating the relative movement distances by dead reckoning, the distance connecting the positions accumulate measurement errors and the current position obtained by satellite positioning may deviate greatly from the accurate value.

On the other hand, in FIG. 4B, if, during the process of obtaining the movement distance from the amount of change in the current positions (black circles) obtained by performing satellite positioning in a non-run-walk activity, the satellite positioning result could not be obtained, dead reckoning is not performed, and as soon as the next satellite positioning results become available, the distance between the current position (hatched circle) and the previous position (the distance between the two positions adjacent in time that are determined by satellite positioning) is obtained as the moving distance (dashed line).

Alternatively, similarly to the above, based on the measurement result of the orientation sensor 192 of the measurement unit 19, the timing and the direction of travel whenever a change in moving direction occurred may be determined, and the moving distances to respective directional movements are distributed between the two points where the positionings were successful in accordance with the respective time intervals (dt1+dt2) spent in the respective directions so as to obtain the movement distance between the two points that are determined by satellite positioning. For example, as shown in FIG. 4B, if there is only one bend in moving direction, the intersection (as indicated by the triangle in FIG. 4B) of a straight line extending from the position immediately before the positioning failure in the travel direction at that time and another straight line on the horizontal plane where the distances from the two points before and after the positioning failure to the intersection are distributed by the ratio of dt1:dt2 can be regarded as a position at which the moving direction has changed in determining the movement distance. Alternatively, the moving distance may be calculated by multiplying the average value of the moving speeds before and after the positioning failure period by the duration of the positioning failure. In this case, it is unnecessary to detect a change in the direction of travel by the measurement unit 19. Furthermore, in this case, depending on the type of activity, the upper limit of the moving distance within the positioning failure period may be set for the linear distances between the two positions, so that temporary movement stop during the positioning failure period can be considered.

Figure 5:
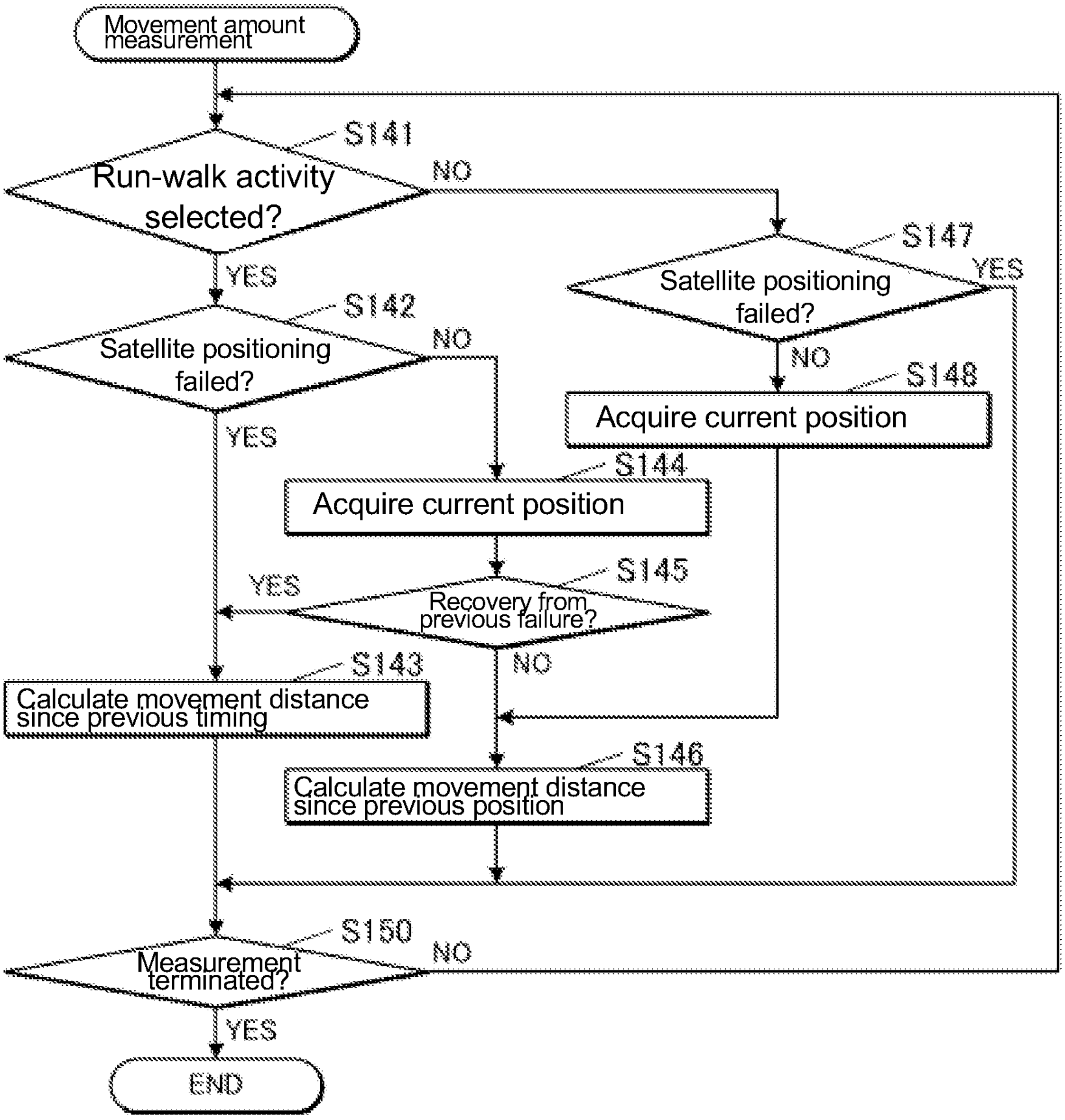
FIG. 5 is a flowchart showing a control procedure of movement amount measurement control processing.

FIG. 5 is a flow chart showing a control procedure by the CPU 11 for movement amount measurement control processing.

This process is started when an instruction for selecting an activity and starting movement amount measurement is acquired by the operation reception unit 15 or the like.

The CPU 11 determines whether or not a run-walk group activity has been selected (step S141). When it is determined that a run-walk group activity is selected ("YES" in step S141), the CPU 11 determines whether acquisition of the satellite positioning result (current position) has failed (step S142).

If it is determined that acquisition of the result of satellite positioning has failed ("YES" in step S142), the CPU 11 calculates the movement distance since the previous timing at which the movement distance was obtained by the pedestrian dead reckoning (PDR), based on the measurement result of the measurement unit 19 (step S143). Then, the processing of the CPU 11 proceeds to step S150.

When it is determined that acquisition of satellite positioning results has not failed ("NO" in step S142), the CPU 11 acquires the current position (step S144). The CPU 11 then determines whether or not that was a recovery from the previous failure in acquisition of the positioning result (step S145).

If it is determined that it is not a recovery from the previous failure ("NO" in step S145), the CPU 11 obtains the difference between the previous position and the current position so as to calculate the movement amount from the position obtained by the previous satellite positioning (step S146). Then, the processing of the CPU 11 proceeds to step S150. If it is determined to be a recovery from the previous failure ("YES" in step S145), the processing of the CPU 11 proceeds to step S143.

When it is determined in the determination process of step S141 that a run-walk activity is not selected (i.e., a non-run-walk activity is selected) ("NO" in step S141), the CPU 11 determines whether or not satellite positioning result acquisition has failed (step S147). If it is determined that acquisition of the result of satellite positioning has not failed ("NO" in step S147), the CPU 11 acquires the current position (step S148). Then, the processing of the CPU 11 proceeds to step S146. In this case, when a recovery from the positioning failure occurs, the "previous position" in step S146 is the position obtained by positioning before the positioning failure occurs.

When it is determined that acquisition of the satellite positioning result has failed ("YES" in step S147), the processing of the CPU 11 proceeds to step S150.

When proceeding to the process of step S150, the CPU 11 determines whether or not an activity measurement termination instruction has been acquired (step S150). If it is determined that the termination instruction has not been acquired ("NO" in step S150), the process of the CPU 11 returns to step S141. If it is determined that the termination instruction has been acquired ("YES" in step S150), all the processing for the measurement of the movement distance is terminated, and the movement amount measurement control processing is terminated. The processes of steps S141, S142, and S147 constitutes a calculation determination unit of this embodiment.

In the above description, examples in which acquisition of the change history of the current position by intermittent reception of satellite radio waves and acquisition of the amount of movement by acquiring positioning results at short time intervals have been described. Instead, change history of the current positions may be acquired, the amount of movement may be obtained by intermittently receiving satellite radio waves and using dead reckoning in combination. In the latter case, positioning may be performed by detecting a change in traveling direction as described above.

As described above, the electronic timepiece 1, which is a wearable device according to the present embodiment, includes the satellite radio wave reception processing unit 18 that receives radio waves from positioning satellites to perform positioning; the measurement unit 19 that measures the orientation and movement of the device itself; the operation reception unit 15 as an acquisition unit that acquires information representing the type of activity (exercise) of the user; and the CPU 11. The CPU 11 determines whether or not to calculate the amount of movement for each time interval based on the measurement results of the measurement unit 19 during a period in which the results of positioning by the satellite radio wave reception processing unit 18 are not obtained, in accordance with the type of activity.

In this way, when it is possible to measure the position and amount of movement during various (multiple) activities, it is possible to switch operation modes by determining whether or not dead reckoning should be performed by acquiring the type of activity and by reflecting the user's exercise type. Thus, it is possible to avoid mixing unnatural results by not performing dead reckoning or acquisition of the results by dead reckoning when dead reckoning for the activity would not produce sufficiently accurate results. As a result, it is possible to suppress deterioration in the accuracy of the acquisition result.

Also, the CPU 11 does not calculate the movement amount when the type of activity is not a run-walk activity. The determination of the movement amount in dead reckoning for a run-walk activity can be relatively accurately performed, but in the case of movement that is not a run-walk activity, the accuracy of dead reckoning is poor. Therefore, by determining whether or not to calculate the movement amount by dead reckoning depending on whether the current activity is related to running or walking, it is possible to suppress the inclusion of unnaturally low-accuracy measurement data.

When the CPU 11 does not calculate the movement amount by dead reckoning, the CPU 11 may calculate the movement distance between the two points based on the positions of the two temporally adjacent points obtained by the satellite radio wave reception processing unit 18. That is, even when positioning is intermittent or includes a section in which satellite positioning has failed, the movement distance may be calculated simply using only successful positioning results. In this case, all the directional changes and the like are omitted, so that the movement distance becomes a minimum value, but it is possible to avoid erroneously inflating the movement distance this way.

Further, the CPU 11 can cause the satellite radio wave reception processing unit 18 to additionally perform satellite positioning even during the predetermined positioning halt period where not only positioning, but also dead reckoning is not performed, when a change in traveling direction is detected by the measurement unit 19 during the predetermined halt period. That is, when the traveling direction changes, the position at which the change occurs can be obtained by satellite positioning. Therefore, it is possible to calculate the amount of movement in line with actual movement while suppressing an increase in power consumption by performing minimal satellite positioning.

The electronic timepiece 1 also includes the operation reception unit 15 that receives an input operation as an acquisition unit. The CPU 11 determines whether or not to calculate the movement amount by dead reckoning according to the activity type determined by the operation received by the operation receiving unit 15. In this way, when the user inputs the activity type at the start of activity measurement, etc., the activity type can be easily and reliably identified, and whether or not to use dead reckoning is determined according to the activity type, thereby preventing inaccurate data contamination.

Also, the measurement unit 19 includes at least one of the acceleration sensor 191 and the orientation sensor 192. Thereby, the CPU 11 can easily identify the timing at which a change in motion such as a change in direction occurs during walking, for example.

Further, in the movement information acquisition control method of the present embodiment, information representing the type of activity of the user of the wearable device (electronic watch 1) is acquired, and whether or not to calculate the movement amount based on the measurement result of the measurement unit 19 during the period in which the result of positioning by the satellite radio wave reception processing unit 18 is not available is determined according to the type of activity.

In such a movement information acquisition control method, it is possible to determine whether or not to perform dead reckoning to switch operation modes by reflecting the type of user's activity. Therefore, it is possible to suppress the deterioration of the accuracy of the obtained result by not performing the processing and the result acquisition related to the dead reckoning for the activities for which the accurate result cannot be obtained by dead reckoning.

In addition, by installing and executing the program 131 for the movement information acquisition control method in the computer of the wearable device (electronic watch 1) having the satellite wave reception processing unit 18 and the measurement unit 19, calculation of the movement trajectory and movement amount can be performed with appropriate accuracy depending on the activities.

It should be noted that the present disclosure is not limited to the above embodiments, and various modifications are possible.

For example, in the above embodiment, satellite positioning is additionally performed when dead reckoning measurement is not to be performed, but the present invention is not limited to this. For example, the satellite positioning interval may instead be changed depending on whether dead reckoning measurement is being performed or not.

In addition, in the above embodiment, it is described that satellite positioning is additionally performed according to changes in the direction of travel in addition to intermittent satellite positioning that is to be performed at a predetermined interval, but the present invention is not limited to this. For example, when additional satellite positioning is performed, it may be determined that the next satellite positioning is performed after said predetermined interval has elapsed since that timing.

In addition, in the above embodiment, the user's exercise type is set by inputting to the operation accepting unit 15, but this is not the only option. The activity may be estimated by determining a characteristic acceleration change pattern based on the measurement result of the measurement unit 19, which depends on the activities. Also, the type of exercise may be specified based on setting data acquired via the communication unit 16.

In addition, in the above embodiment, the determination criterion is whether or not the identified activity is a run-walk group activity, but whether or not dead reckoning is used in combination may be determined based on whether or not the period of the movement pattern and the speed per such a period can be accurately determined.

Also, the electronic timepiece 1 of the present embodiment, which is a wearable device, does not always have to be worn on the body for use. For example, it may be attached to a handle or the like when performing an activity such as riding a bicycle.

Also, the wearable device is not limited to the electronic timepiece 1. An activity meter such as a smart watch, which is another terminal device worn on the arm, may be used, or a device fixed to the upper arm, head, torso, or leg may be used.

Also, in the above embodiment, the acceleration sensor 191 and the orientation sensor 192 are described as examples of the measurement unit 19, but the measurement unit 19 is not limited to this. Other sensors, such as gyro sensors, may also be used.

In the above description of the present disclosure, the storage unit 13 made up of a non-volatile memory such as a flash memory is used as an example of a computer-readable medium that stores the program 131 for the measurement control of the user's exercise. But the present invention is not limited to this. As other computer-readable media, it is possible to apply other non-volatile memories such as HDDs (Hard Disk Drives) and MRAMs, and portable recording media such as CD-ROMs and DVD disks. A carrier wave is also included in the present disclosure as a medium for providing program data via a communication line.

In addition, the specific configuration, contents and procedures of processing operations, etc., shown in the above embodiment can be changed as appropriate without departing from the gist of the present disclosure.

According to the present disclosure, the user's exercise type can be more accurately reflected in switching operation modes.

Although several embodiments have been described, the scope of the present disclosure is not limited to the above-described embodiments, but includes the scope of the disclosure described in the claims and its equivalents. It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A wearable device, comprising:

a physical sensor that performs measurements relating to an orientation and movement of the wearable device;

an acquisition unit that acquires information representing a user's exercise type; and a processor that performs positioning of the wearable device intermittently with an idle period in between based on radio waves received from satellites, wherein the processor determines whether to calculate a movement amount of the wearable device per set intervals based on measurement results of the physical sensor during a period in which the positioning based on radio waves received from satellites is not obtained, in accordance with the user's exercise type acquired by the acquisition unit, and wherein if, during the idle period, the movement amount is not calculated and a change in traveling direction is detected based on the measurement results of the physical sensor, the processor resumes the positioning based on radio waves received from satellites, wherein when the user's exercise type acquired by the acquisition unit is an activity involving the user's running or walking movements, the processor calculates the movement amount and movement direction based on the measurement results of the physical sensor during the idle period, and wherein when the user's exercise type acquired by the acquisition unit is an activity that does not involve the user's running or walking movements, during the idle period, the processor calculates the movement direction based on the measurement results of the physical sensor without calculating the movement amount, and if a change in the calculated movement direction is detected during the idle period, the processor causes the positioning based on the radio waves to resume before the idle period expires so as to calculate the movement amount based on the positioning without calculating the movement amount based on the measurement results of the physical sensor.

2. The wearable device according to claim 1, wherein when the movement amount is not calculated, the processor calculates a movement distance between two points adjacent in time based on positions of the two points obtained by performing positioning based on radio waves received from satellites.

3. The wearable device according to claim 1, wherein the acquisition unit includes an operation reception unit that receives an input operation specifying the user's exercise type.

4. The wearable device according to claim 1, wherein the physical sensor includes at least one of an acceleration sensor and an orientation sensor.

5. The wearable device according to claim 1, wherein the change in the movement direction is detected based on cumulative directional changes or average directional changes.

6. The wearable device according to claim 1, wherein the activity that does not involve the user's running or walking movements is an activity for which a period of a movement pattern and a speed per such a period cannot be accurately determined.

7. A method for controlling acquisition of movement information of a wearable device, performed by the wearable device, the wearable device including a physical sensor that performs measurements relating to an orientation and movement of the wearable device, the method comprising:

acquiring information representing a user's exercise type;

performing positioning of the wearable device intermittently with an idle period in between based on radio waves received from satellites; and determining whether to calculate a movement amount of the wearable device per set intervals based on measurement results of the physical sensor during a period in which the positioning based on radio waves received from satellites is not obtained, in accordance with the user's exercise type, and wherein if, during the idle period, the movement amount is not calculated and a change in traveling direction is detected based on the measurement results of the physical sensor, resuming the positioning based on the radio waves received from the satellites, wherein when the user's exercise type acquired by the acquisition unit is an activity involving the user's running or walking movements, the movement amount and movement direction are calculated based on the measurement results of the physical sensor during the idle period, and determining that the user's exercise type acquired by the acquisition unit is an activity that does not involve the user's running or walking movements, wherein when the user's exercise type acquired by the acquisition unit is an activity that does not involve the user's running or walking movements, during the idle period, the movement direction is calculated based on the measurement results of the physical sensor without calculating the movement amount, and detecting a change in the calculated movement direction during the idle period, and when a change in the calculated movement direction is detected during the idle period, the positioning based on the radio waves is resumed before the idle period expires so as to calculate the movement amount based on the positioning without calculating the movement amount based on the measurement results of the physical sensor.

8. The method according to claim 7, wherein the change in the movement direction is detected based on cumulative directional changes or average directional changes.

9. The method according to claim 7, wherein the activity that does not involve the user's running or walking movements is an activity for which a period of a movement pattern and a speed per such a period cannot be accurately determined.

10. A non-transitory storage medium readable by a computer in a wearable device that includes a physical sensor that performs measurements relating to an orientation and movement of the wearable device, the non-transitory storage medium storing a program executable by the computer, the program causing the wearable device to perform the following:

acquiring information representing a user's exercise type;

performing positioning of the wearable device intermittently with an idle period in between based on radio waves received from satellites; and determining whether to calculate a movement amount of the wearable device per set intervals based on measurement results of the physical sensor during a period in which the positioning based on radio waves received from satellites is not obtained, in accordance with the user's exercise type, and wherein if, during the idle period, the movement amount is not calculated and a change in traveling direction is detected based on the measurement results of the physical sensor, the positioning based on the radio waves received from the satellites is resumed, wherein when the user's exercise type acquired by the acquisition unit is an activity involving the user's running or walking movements, the movement amount and movement direction are calculated based on the measurement results of the physical sensor during the idle period, and wherein when the user's exercise type acquired by the acquisition unit is an activity that does not involve the user's running or walking movements, during the idle period, the movement direction is calculated based on the measurement results of the physical sensor without calculating the movement amount, and if a change in the calculated movement direction is detected during the idle period, the positioning based on the radio waves is resumed before the idle period expires so as to calculate the movement amount based on the positioning without calculating the movement amount based on the measurement results of the physical sensor.

11. The non-transitory storage medium according to claim 10, wherein the change in the movement direction is detected based on cumulative directional changes or average directional changes.

12. The non-transitory storage medium according to claim 10, wherein the activity that does not involve the user's running or walking movements is an activity for which a period of a movement pattern and a speed per such a period cannot be accurately determined.

* * * * *